March 17, 1970 R. A. HARRIST 3,500,592
PLASTIC HUB AND THE APPLICATION THEREOF TO AN ABRASIVE WHEEL
Filed Jan. 9, 1968
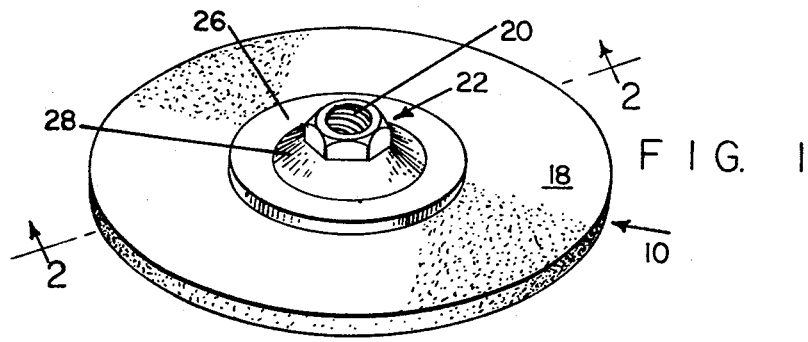
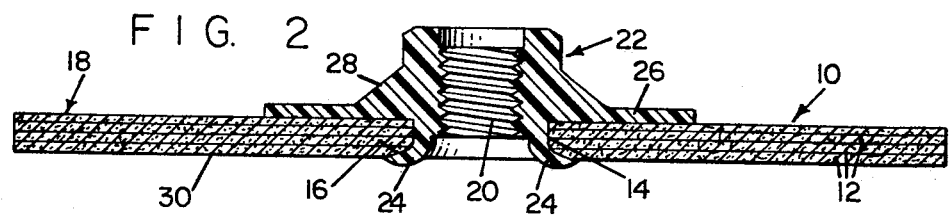
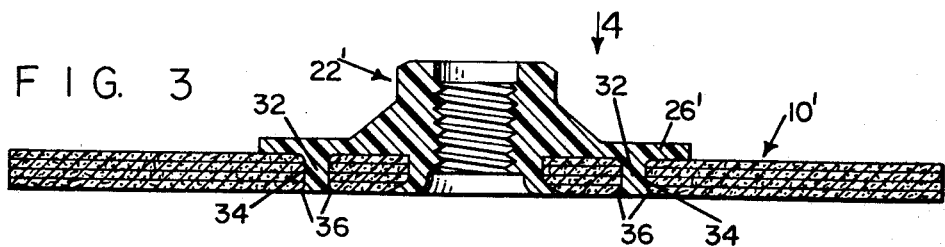
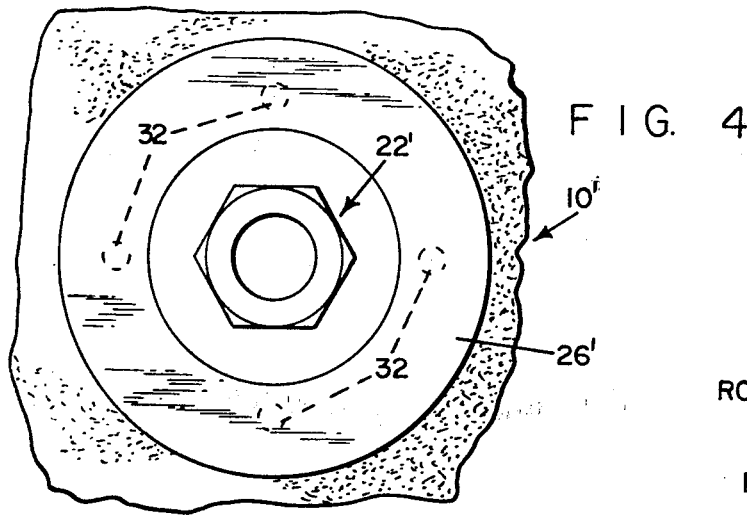
INVENTOR
ROBERT A. HARRIST
BY *Chas. R. Fay*
ATTORNEY

United States Patent Office 3,500,592
Patented Mar. 17, 1970

3,500,592
PLASTIC HUB AND THE APPLICATION THEREOF TO AN ABRASIVE WHEEL
Robert A. Harrist, 17 Crowningshield Drive, Paxton, Mass. 01612
Filed Jan. 9, 1968, Ser. No. 696,658
Int. Cl. B24d 17/00
U.S. Cl. 51—376                      6 Claims

ABSTRACT OF THE DISCLOSURE

An abrasive wheel comprising two parts only, a disc having a central aperture therein and a one-piece plastic hub molded onto the disc, the hub including a threaded aperture, a broad circular flange, and a tubular projection extending through the aperture in the disc and into close cooperation with a countersunk portion at the opposite side of the disc from the main body of the hub and the circular flange, there being a bonding agent first applied to the disc in the area thereof that the plastic hub is to be molded.

---

It has been suggested in the prior art to provide a steel, threaded hub permanently bonded to an abrasive disc by means of epoxy and by peening over an extension of the hub at the opposite side of the disc from the main portion thereof. By such means in the prior art the use of washers, clamps, etc. are completely done away with but at the same time the epoxy is expensive and the steel hub is relatively heavy and needs finish work done on it before it is in condition for use.

It is an object of the present invention to completely obviate the epoxy; and to avoid up to nine-tenths of the weight of the steel hub and all the finish work on the steel hub, by directly molding a very strong plastic hub to the abrasive disc and forming at once a threaded hub which has a tubular portion extending through the center aperture in the disc to permanently bond the plastic hub to the disc. With the use of any plastic e.g. thermosetting or thermoplastic, of high tensile strength, it has been found that in breakage tests the abrasive disc breaks away before the plastic hub is damaged.

Other objects and advantages of the invention will appear hereinafter.

Reference is to be had to the accompanying drawings in which:

FIG. 1 is a perspective view showing an abrasive wheel embodying the principles of the present invention;

FIG. 2 is a section on line 2—2 of FIG. 1;

FIG. 3 is a view similar to FIG. 2 showing a modification, and

FIG. 4 is a plan view looking in the direction of arrow 4 in FIG. 3, the disc being broken away.

As an example of an abrasive wheel to which the present invention is applied, there is illustrated herein, a disc 10 made up of a number of bonded layers of e.g. fiber-glass mesh. The fiber-glass is impregnated with a mixture of abrasive and a bonding agent so that when hardened the fiber-glass and abrasive form a hard generally inflexible disc which is porous and is provided with a relatively large central aperture as at 14 undercut at one side of the disc as at 16.

Such a disc has a material in the nature of liquid phenol formaldehyde applied to a surface thereof i.e., the surface 18 in FIGS. 1 and 2, adjacent the aperture 14, and when this has been done the one piece plastic hub of the present invention is molded directly onto the disc. An arbor or form is used to form the central threaded opening in the hub clearly indicated at 20 which extends through the entire hub which is generally indicated at 22, or the thread can be cut afterwards. It is to be noted that this one piece plastic hub may be injection molded or molded in any other manner but in any event it is permanently bonded to the wheel not only in the areas where the liquid phenol formaldehyde has been applied, but is mechanically locked thereto through the relatively circumferentially outstanding areas at 24, 24 covering the countersunk disc portions 16. The hub also includes a relatively large circular flange area at 26 overlying the area which had the liquid phenol formaldehyde applied to it and in some cases a slight plastic build-up in the area 28 may be provided.

It will be seen in FIG. 2 that in the countersunk areas the plastic material at 24 may project slightly beyond the face 30 of the abrasive disc 10, but this material may be ground off if it should be desired to do away with it although in some cases it is preferred to remain. Alternatively the areas at 24 may be formed to stop short at the general plane of the surface 30 of the abrasive disc 10 so that no grinding off is necessary.

A modification of the invention is illustrated in FIGS. 3 and 4 wherein the plastic hub 22' is formed with a plurality of integral studs 32, 32 which extend through holes 34, 34 previously provided in the disc 10, and these also may be undercut as is indicated at 36, 36 for additional physical strength. In this case the studs are solid although the entire plastic hub is still one piece, the studs being integral with the flange indicated at 26'.

Actual tests of discs made according to this invention show that the fiber-glass material breaks before the plastic material of the hub. Merely as an example of a plastic material which may be used in order to carry out the invention and obtain the results stated, a "modified phenoline oxide" or similar material is found to be satisfactory.

The liquid phenol formaldehyde material which is applied to the surface of the abrasive disc prior to the molding operation permeates the interstices of the porous fiber-glass disc, and the plastic material apparently has an affinity for this material so that an unexpectedly strong bond is provided between the plastic hub and the abrasive disc.

This invention eliminates all finish work on prior art steel hubs as the steel hub itself is completely eliminated; the weight of the new plastic hub is approximately one-tenth the weight of the steel hub, and the use of expensive epoxy is completely eliminated, so that the present invention provides a superior product less expensively.

Having thus described my invention and the advantages thereof, I do not wish to be limited to the details herein disclosed, otherwise than as set forth in the claims, but what I claim is:

1. An abrasive wheel comprising a disc impregnated with abrasive material and having a central aperture, a molded plastic unitary one piece hub secured to the central portion of the disc, the main portion of the hub being generally at one side of the disc, a tubular projection centrally located on the hub and extending through the disc aperture, the disc having a countersunk portion about the aperture at the opposite side of the disc from the main portion of the hub, the tubular projection having an annular portion extending outwardly into the area of the countersunk portion to overlap the disc in the area surrounding the aperture in the disc, and the hub including a broad integral flange extending laterally over the side of the disc having the main portion of the hub thereon, the hub thereby being physically locked to the disc.

2. The abrasive wheel of claim 1 including a stud on said flange spaced from said tubular projection, said stud extending through an aperture in the disc.

3. The abrasive wheel of claim 1 including a stud on said flange spaced from said tubular projection, said stud extending through an aperture in the disc, the last-mentioned aperture being countersunk at the side of the disc opposite the main portion of the hub and the plastic material of the stud extending into the last-named countersunk area.

4. The abrasive wheel of claim 1 including a bond between the disc and said hub.

5. The abrasive wheel of claim 1 wherein the plastic hub comprises a material in the nature of a modified phenoline oxide.

6. The abrasive wheel of claim 1 including a bond between the disc and said hub, said bond including liquid phenol formaldehyde.

References Cited

UNITED STATES PATENTS

| 2,370,323 | 2/1945 | Patt | 51—358 |
| 2,581,567 | 1/1952 | Wiley | 51—358 |
| 2,958,166 | 11/1960 | Foland | 51—358 |
| 3,395,417 | 8/1968 | Matouka | 51—358 X |

OTHELL M. SIMPSON, Primary Examiner

Notice of Adverse Decisions in Interferences

In Interference No. 97,840 involving Patent No. 3,500,592, R. A. Harrist, PLASTIC HUB AND THE APPLICATION THEREOF TO AN ABRASIVE WHEEL, final judgment adverse to the patentee was rendered July 5, 1973, as to claims 1, 4, 5 and 6.

[*Official Gazette November 27, 1973.*]